United States Patent
Levasseur et al.

(10) Patent No.: US 8,593,473 B2
(45) Date of Patent: Nov. 26, 2013

(54) DISPLAY DEVICE AND METHOD FOR OPTIMIZING THE MEMORY BANDWITH

(75) Inventors: Nicolas Levasseur, Cestas (FR); Laurent Jardin, Saint Jean d'Illac (FR); Jean-René Verbeque, Saint Auibin de Medoc (FR)

(73) Assignee: Thales, Neuilly sur Seine (FR)

( * ) Notice: Subject to any disclaimer, the term of this patent is extended or adjusted under 35 U.S.C. 154(b) by 476 days.

(21) Appl. No.: 12/809,273

(22) PCT Filed: Dec. 15, 2008

(86) PCT No.: PCT/EP2008/067554
§ 371 (c)(1),
(2), (4) Date: Oct. 14, 2010

(87) PCT Pub. No.: WO2009/077503
PCT Pub. Date: Jun. 25, 2009

(65) Prior Publication Data
US 2011/0018886 A1    Jan. 27, 2011

(30) Foreign Application Priority Data
Dec. 18, 2007 (FR) ..................... 07 08845

(51) Int. Cl.
*G09G 5/36* (2006.01)
*G09G 5/39* (2006.01)
*G06F 12/06* (2006.01)
*G06K 9/34* (2006.01)
*H04N 9/74* (2006.01)

(52) U.S. Cl.
USPC ........... 345/556; 345/531; 345/557; 345/572; 382/173; 348/586

(58) Field of Classification Search
None
See application file for complete search history.

(56) References Cited

U.S. PATENT DOCUMENTS

| | | | |
|---|---|---|---|
| 2002/0085013 A1 | 7/2002 | Lippincott | |
| 2002/0140685 A1 | 10/2002 | Yamamoto et al. | |
| 2003/0160796 A1* | 8/2003 | Lavelle et al. | 345/557 |
| 2005/0246433 A1 | 11/2005 | Carrigan | |
| 2007/0031037 A1* | 2/2007 | Blake et al. | 382/173 |
| 2008/0226273 A1* | 9/2008 | Kaku | 396/3 |

FOREIGN PATENT DOCUMENTS

EP    1 287 494    3/2003

OTHER PUBLICATIONS

Bosch, JE., "Flight Instrumentation System for Visual Approaches," Feb. 1, 1988.*

* cited by examiner

*Primary Examiner* — Tize Ma
(74) *Attorney, Agent, or Firm* — Baker Hostetler LLP

(57) ABSTRACT

A display device that comprises a flag memory containing state flags of pixel areas of the image is provided. The display device comprises a display screen and a graphical generation unit implementing at least three functions for displaying an image, i.e. a first data erasure function, a second function for generating an image comprised of pixels in a first memory, and a third function for displaying the image by reading the pixels in said memory and controlling the screen, in which an image is divided into a plurality of separate pixel areas and in that each area is addressed by a flag, wherein the display device further includes a memory that stores the flag states so that the graphical generation unit can execute the display function on the basis of the flag states. The generation of images having a predominantly uniform background can, in particular, be used for application in aeronautics.

7 Claims, 4 Drawing Sheets

DISPLAY DEVICE AND METHOD FOR OPTIMIZING THE MEMORY BANDWITH

CROSS-REFERENCE TO RELATED APPLICATIONS

This application is a National Stage of International Patent Application No. PCT/EP2008/067554, filed on Dec. 15, 2008, which claims priority to foreign Patent Application No. FR 07 08845, filed on Dec. 18, 2007, the disclosures of which are incorporated herein by reference in their entirety.

FIELD OF THE INVENTION

The field of the invention relates to display devices for aircraft and more particularly the management of memory access between a graphics microprocessor and the dedicated frame memory. More generally, the invention applies to any display device.

BACKGROUND OF THE INVENTION

Display devices operate on graphics architectures, known to those skilled in the art, based on integrated logic circuits of the FPGA, "Field Programmable Gate Array" type or of the ASIC, "Application Specific Integrated Circuit" type. These components, called GPUs ("Graphical Processor Units"), are integrated circuits dedicated to the graphical generation performing functions of generating basic graphics shapes such as a triangle, a line or a dot. These shapes are called primitives. The GPUs are usually accompanied by frame memory, today usually of the DDR ("Double Data Rate") type, which contains the pixels that are displayed on the screen. It is in this buffer memory that they are saved just before being displayed on the screen. In this type of architecture, all the images are obliged to be transferred from the GPU to the memory. The hardware architectures now support high data rates allowing the generation of streams of images of better quality and of greater size.

However, the aviation field is subject to extremely severe standards of reliability of the electronic circuits. The electronic components must usually demonstrate an error probability rate of less than $1.10^{-9}$ per hour of flight. That is why the architectures used in this field do not operate the electronic systems up to the limit of technological performances. The designers rather seek to optimize the applications from the safety point of view by limiting the bandwidth requirements. The usual problem is therefore to surpass this limitation in bandwidth between the GPU and the frame memory for the graphics generation functions.

A system for generating synthetic images, that is to say that the images are made up of primitives, consists of at least two sub-functions: a function of generating the image, which consists in writing in a dedicated memory space the information specific to each pixel, and a function of displaying the image, which consists in rereading the information specific to each pixel in order to drive a video device.

GPUs usually work with several frame memory spaces, typically two, called pages. When one page is used by the display function, the other page is available for the function of generating the image. These pages may be physical, that is to say distributed over distinct hardware resources, or logical, that is to say distributed over common hardware resources. The logical pages are very largely preferred today because they are more economical in hardware resources. The result of this is that the memory bandwidth has to be shared between the function for generating the image and the function for displaying the image. In addition, any generation of an image must also begin with a complete erasure.

There are many techniques, based on buffer memories, which make it possible to reduce the memory bandwidth necessary to generate the image. However, these techniques are ineffective for the display and erase function because the frame memory is accessed linearly and in its totality. Buffer memories incorporated in GPUs provide greater data rates than frame memories, but they are limited in capacity and therefore do not make it possible to replace frame memories.

The major problem unresolved by the prior art is that the memory bandwidth necessary for a graphics system is not proportional to the complexity of the image generated. Usually, for aviation applications, the images are mostly composed of a black or transparent background depending on whether the type of display is based on liquid crystal screens or on holographic projections. The image usually comprises simple symbols as in the example of the displays of flight plans or of flight function interfaces.

FIG. 1 represents an image consisting mainly of a few symbols in black pixels on a uniform background; only 1.44% of memory reads and writes are used for the trace. The method for generating an image consists in carrying out initially a complete erasure of the frame memory, then the function of generating the image and then the function of displaying the image. In this example according to FIG. 2, the function of generating the image gains access to the frame memory 1 in normal mode, that is to say pixel by pixel, in order to write the information relating to each pixel.

In the example of FIG. 1, the image comprises 110 pixels 12 containing an item of information and the other pixels 11 represent the background of the image. According to FIG. 2, when the graphics generation unit 4 performs the erasure function "ERASE" and that of displaying the image "DISPLAY", the frame memory 1 must be accessed in totality and linearly in order to read all of the pixels of the image and drive the screen 6. For the trace of the image in the memory 1, the function "GENERATE" writes only the pixels 12 in the memory 1. For the image according to FIG. 1, the total in quantity of data for the transfer between the GPU and the frame memory in order to generate an image is:
  erase: 64×48=3072 pixels
  trace: 110 pixels
  display function: 64×48=3072 pixels
namely a total number of words accessed per frame of 6254.

SUMMARY OF THE INVENTION

More precisely, the invention relates to a display device comprising a display screen and a graphics generation unit performing at least three functions in order to display an image, a first function of erasing data, a second function of generating an image consisting of pixels in a first memory and a third function of displaying the image reading the said pixels in the said memory and controlling the screen, characterized in that an image is divided into several distinct zones of pixels and each zone is addressed by a flag, and the display device also comprises a second memory saving the state of the flags allowing the graphics generation unit to execute the display function depending on the state of the flags, the flags having two states:
  a first state if the addressed pixel zone comprises at least one pixel that has been modified by the image-generation function;
  a second state if no pixel of the addressed pixel zone has been modified by the image-generation function.

The invention relates to a display device and a method for generating an image making it possible to optimize the bandwidth between the graphics generation unit, usually called the GPU in the field of graphics cards, and the associated frame memory. The invention is beneficial because it has an optimized means of managing the bandwidth for accesses to the memory for the generation of an image. The data rate necessary for generating an image is proportional to the complexity of the image. Therefore, for simple images, the number of reads and writes between the GPU and the frame memory is also smaller.

The invention is notably advantageous for display devices having on the screen images comprising a uniform and predominant background. It is particularly designed for the applications of the aviation field since the flight displays must have simple images. For example, on flight plan displays or the interfaces of the applications, the critical data are usually presented on a generally uniform background.

BRIEF DESCRIPTION OF THE DRAWINGS

The invention will be better understood and other advantages will become apparent on reading the following description given on a non-limiting basis and by virtue of the appended figures amongst which.

DETAIL DESCRIPTION

Figure 3:
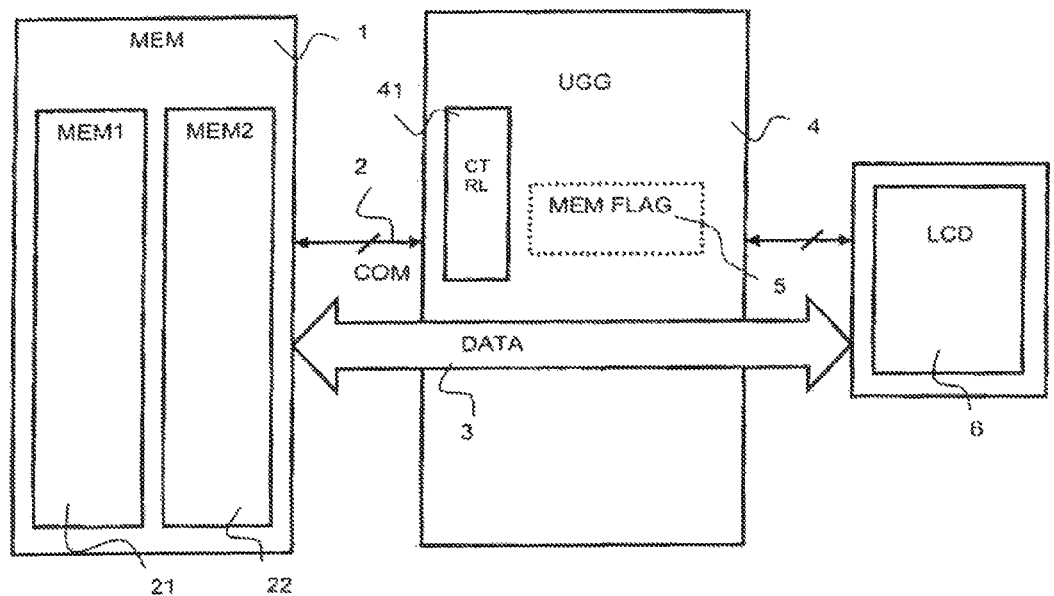
FIG. 3 represents a hardware architecture of the device according to the invention.

As a non-limiting example, FIG. 3 illustrates a graphics generation unit 4 communicating with a first frame memory 1 and an LCD screen 6. According to the invention, in a first embodiment, the graphics generation unit 4 incorporates a second memory 5. In a second embodiment, this memory 5 can be incorporated into the frame memory 1. This second memory contains the flags encoding the states of the pixel zones that they address. In the first embodiment, this memory is called a cache, that is to say that it has a smaller data capacity but has better performance than the frame memory. The graphics generation unit 4 works with several memory spaces, typically two memory spaces called pages. These memory spaces 21 and 22 are distributed over a common memory, the frame memory 1 of the DDR type. This memory communicates with the graphics generation unit via a data bus symbolized in FIG. 3 by a "DATA" bus 3 and by a command bus symbolized in the same figure by a "COM" bus 2. This "COM" bus represents, for simplicity, the address bus and the command signals driven by the graphics generation unit. These command signals are generated by a memory controller 41, the task of which is to drive the memory reads and writes.

Figure 1:
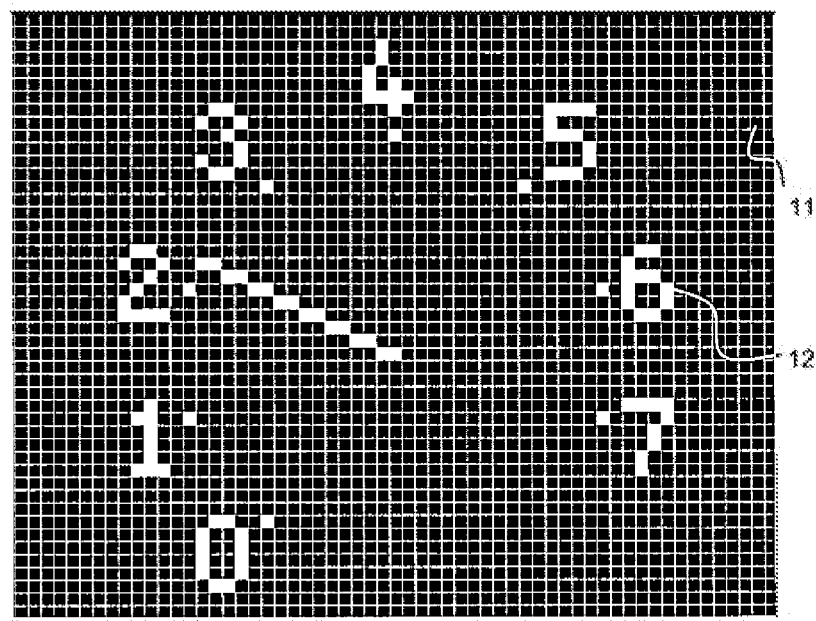
FIG. 1 represents a type of image usually displayed on the instrument panels on board an aircraft.
Figure 4:
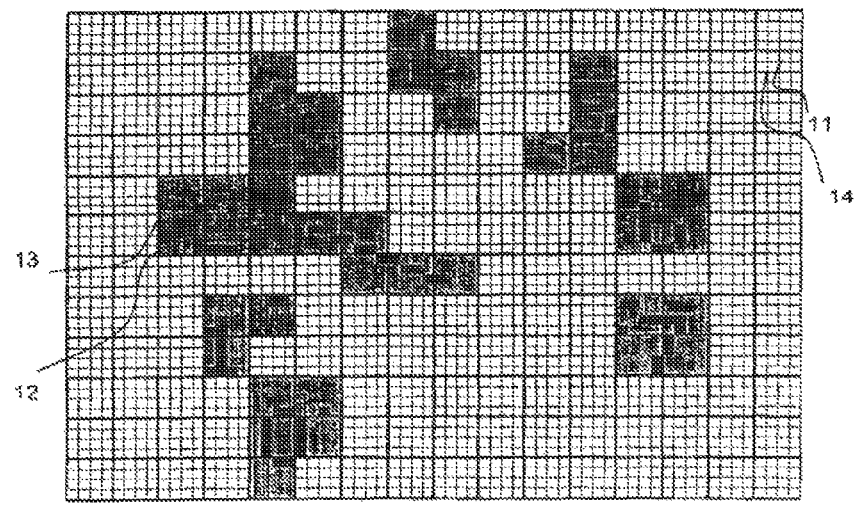
FIG. 4 represents a flow chart of the sequence of steps for the generation of an image according to the invention.

With reference to FIG. 4, which uses the same image as FIG. 1, the invention consists in spatially dividing an image into pixel zones. In this non-limiting example, the image comprises 3072 pixels and is divided into 192 zones of 16 pixels. Each zone is addressed by a flag and each flag represents two states. During the execution of generation of an image, pixel information is written into the frame memory 1 as is the case for the pixel 12. During the execution of this function, the flag of the zone 13 is set to a state signaling that at least one of the pixels of the zone 13 has been written during the trace of the image. Finally, following the function for generating the image, all the pixel zones comprising at least one pixel having been written have a flag in a state signaling that the pixel zone has been written. The zones comprising only pixels encoding the background of the image such as the pixel 11 have their flag in a state signaling that they have not been written, as is the case for the zone 14. The invention therefore consists in detecting the pixel zones written in the first memory 1 during the execution of the function of tracing the image and in saving this information in the second memory 5. The encoding of the states of pixel zones does not require a large quantity of memory because a state can be encoded on only one data bit. This is why a cache memory can be used to save the flags. The function performing the detection of written pixels is known to those skilled in the art and can be performed by the memory controller 41.

Figure 2:
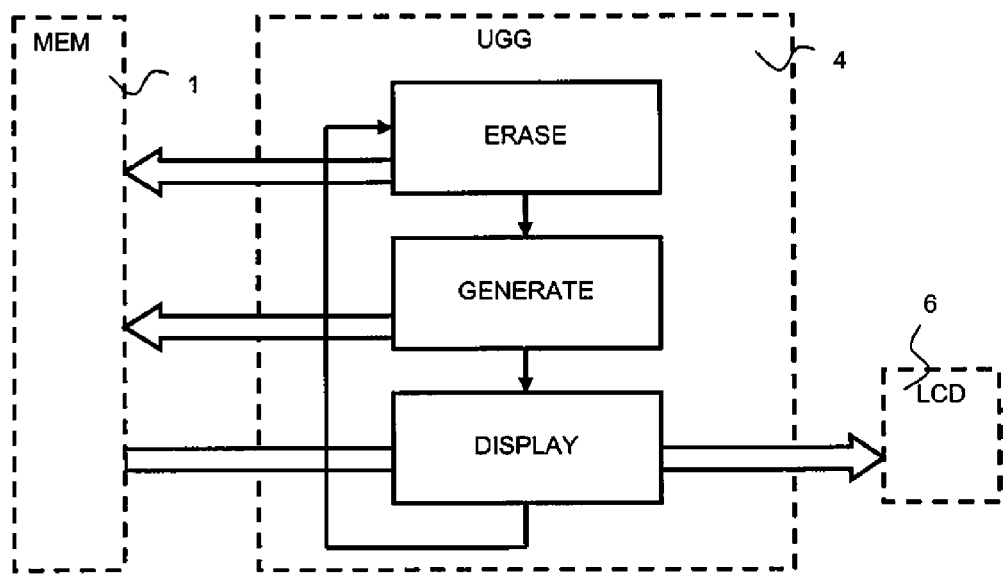
FIG. 2 represents a flow chart of the sequence of steps according to the prior art for the generation of an image.

With reference to FIG. 2, the generation of an image according to a conventional method consists in initially carrying out a complete erasure of the image contained in one of the memory spaces 21 and 22, in writing the information relative to the pixels in the same memory space and then in reading this information and driving the display screen 6.

Figure 5:
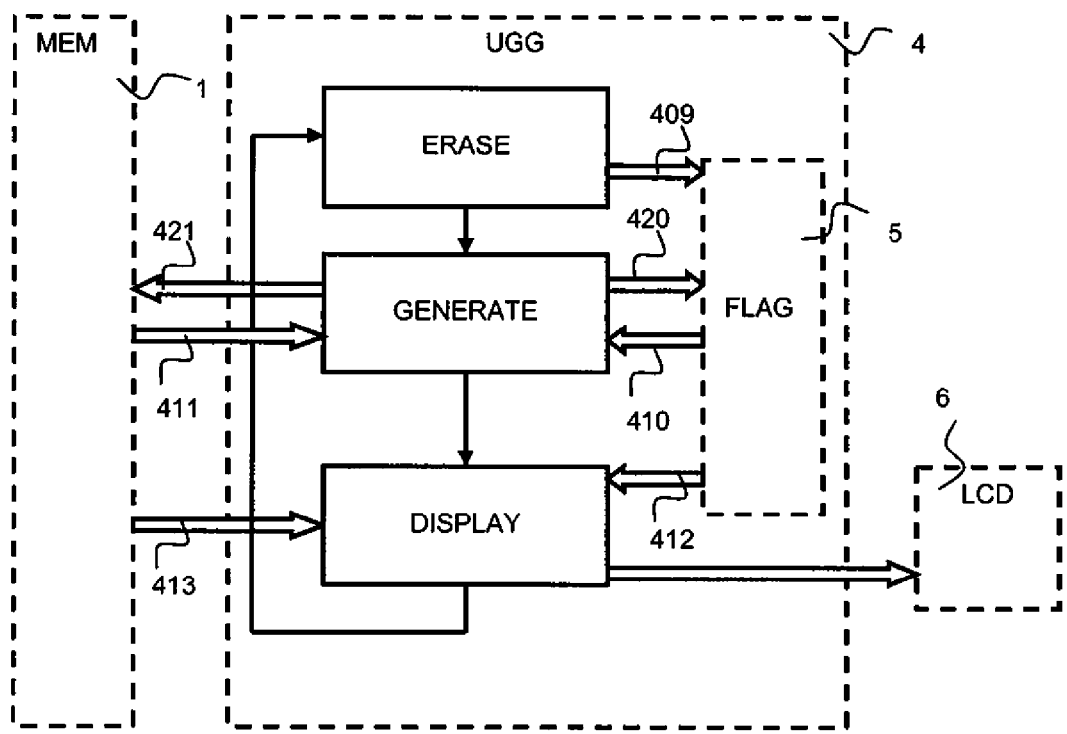
FIG. 5 represents an example of spatial partition of an image according to the invention.

FIG. 5 represents a method for generating the image according to the invention. The wide-lined arrows represent hardware operations of the invention such as reads and writes in the frame memory 1 and the flag memory 5. The thin-lined arrows represent the changes of steps of the method. This method comprises the following steps:

in a first step, "ERASE", the graphics generation unit 4 performs a function of erasing the flags of the second memory 5, the flags are then encoded in the second state during the access 409;

in a second step, "GENERATE", the graphics generation unit 4 performs the function of generating the image, access 421, in the first memory 1 and in parallel encodes, during the access 420 in the second memory 5, the state of the flags of the written pixel zones, the state of the flags being encoded in the first state;

in a third step, "DISPLAY", the graphics generation unit 4 performs the display function, consulting both the flag memory during the access 412, which reads, access 413, in the first memory 1, the pixel zones 13 of which the flag is in the first state and gives a default value to the pixels of the zones 14 of which the flag is in the second state.

This method is noteworthy because it uses the same functions as the methods of conventional image generation, except that they are applied to different electronic elements. The method according to the invention makes it possible to reduce the number of reads and writes in the first frame memory 1. Specifically, the invention consists in optimizing the number of reads and writes and in reading in the frame memory 1 only the pixel zones written during the function of generating the image. When a pixel zone is not written in the frame memory 1, it means that this pixel represents the background of the image and therefore has a known value.

Advantageously, the default value allocated by the display function to the pixel zones of which the flag is in the second state is the value which encodes the background frame of the image. Therefore the graphics generation unit 4 is capable of generating the value of the pixel zones encoding the background of the image, then making it possible not to read the frame memory 1. A means of reading only the pixel zones written in the frame memory 1 is to use a means for detecting and for signaling the written pixel zones. This is the function fulfilled by the second memory 5 which saves flags in a first state when a pixel zone has been written and in a second state when none of the pixels of the zone has been written.

This means for detecting pixel zones accessed during the step for generating the image makes it possible at the same time to no longer directly erase the image and therefore to reduce the number of reads and writes in the frame memory 1. Specifically, by erasing the flag memory 5 instead of the image contained in the frame memory 1, the flags are set at a value signaling to the graphics generation unit that the image in the frame memory 1 has been erased. Consequently, the first erasure step "ERASE" performs no memory access in the frame memory 1. In the embodiment according to which the memory 5 is incorporated into the frame memory 1, the number of reads and writes for erasing the flags is smaller than for erasing an image because it involves erasing pixel zones.

Advantageously, when an image is traced, the flags of the affected zones are set. During this step, all the pixels of the zone are written. Even the pixels encoding the background of the image because all of the pixels of a zone in which the flag is set are read. In this manner a targeted erasure is carried out to erase the pixels of the previous image that are in the zone that will be read in the next step.

Figure 6:
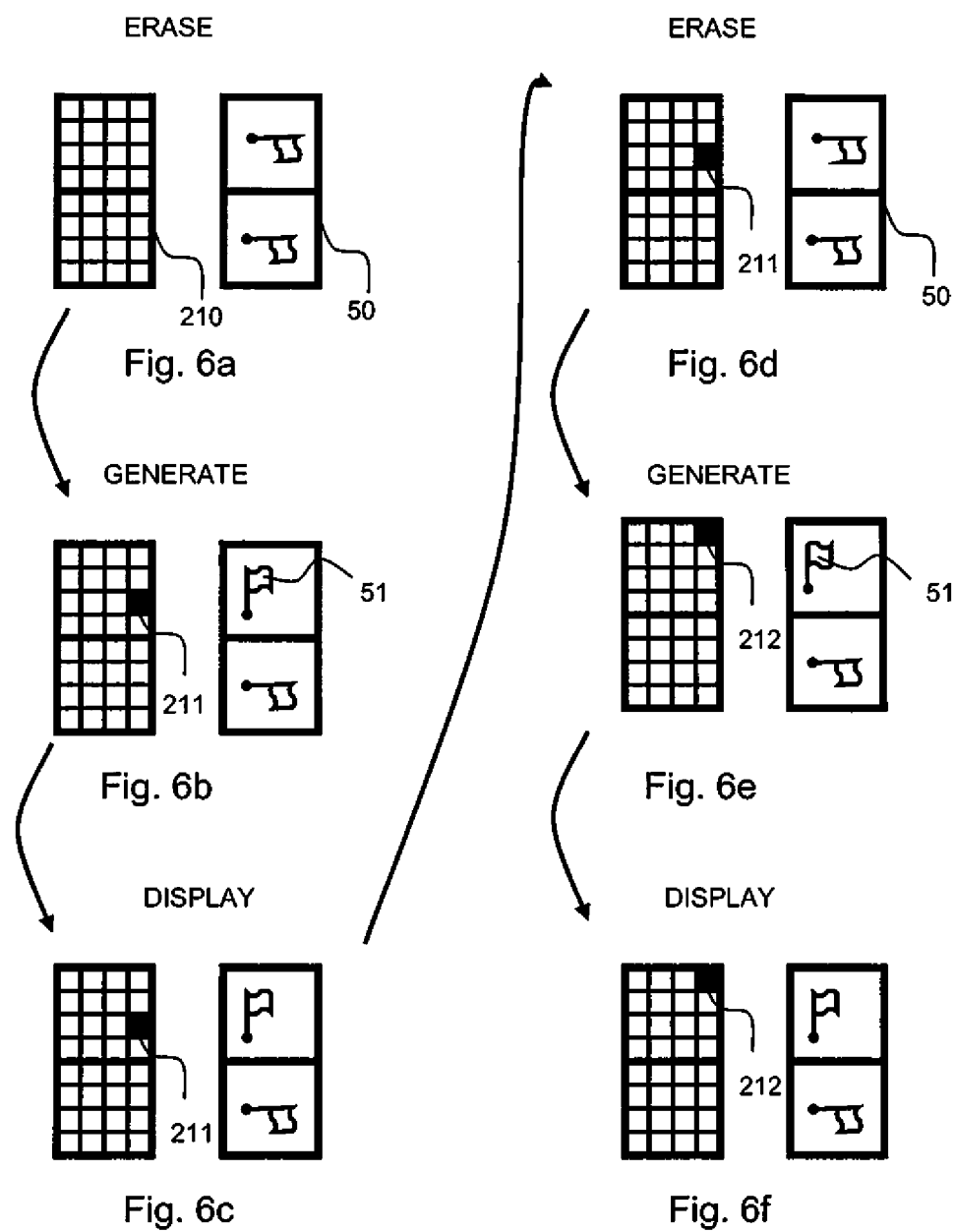
FIG. 6 represents an instance of writing of pixels and management of the associated flags.

FIG. 6 illustrates the situation in which a pixel is written in the same zone as a pixel of the previous image and in which the pixel of the previous image is not rewritten. FIGS. 6a, 6b and 6c illustrate an "image n" and the FIGS. 6d, 6e and 6f an "image n+1" in the same memory space. As a non-limiting example, the case of an image portion 210 of 32 pixels comprising two pixel zones of 16 pixels is studied. In FIG. 6a, this portion is blank and the graphics generation unit carries out the erasure of the portion 50 of the flag memory 5. Then, the graphics generation unit carries out the function of generating the image during which a pixel 211 is written. The flag 51 of this zone is set in the first state. In FIG. 6c, the graphics generation unit displays the zone of the pixel 211 and allocates the value encoding the background of the image to the pixels of the other pixel zones. For the generation of the next image in the same memory space, the graphics generation unit erases the flag memory 50. FIG. 6d shows that the pixel 211 of the previous image is still present in the frame memory because the latter has not been erased. FIG. 6e illustrates the generation of the next image. All the pixels of the zone are written and therefore erase the pixel of the previous image. A new pixel 212 is written in the frame memory and the flag 51 is set. The pixel 211 is erased because the generation function writes a pixel encoding the background of the image on the pixel 211. FIG. 6f shows that the display function during the third step "DISPLAY" does not display the pixel of the previous image.

With reference to FIG. 4, 40 written pixel zones are counted like zone 13 during the function for generating the image. The total of the number of reads and writes in the frame memory 1 is therefore as follows:

erase: 0 pixel
trace: 40*16=640 pixels
display function: 40*16=640 pixels or a total number of words accessed per frame of: 1280.

Depending on the type of memory used, it is also possible to carry out memory reads and writes in "burst" mode, that is to say, in the case of writing an image for example, several pixels are written in the memory following one and the same write setpoint. This type of transfer is advantageous because it makes it possible to increase the bandwidth of the data transfers between the GPU and the memory. In one embodiment, the first memory has a burst data access mode; the size of the data in the pixel zone addressed by a flag is equal to an integer multiple of the size of the data accessed in one cycle of the memory burst mode. Specifically, the invention takes advantage of this access mode because the invention requires that the pixels of an entire zone be written. It is clear that the memory used is not limited to that of the DDR type.

According to FIG. 5, in the second step "GENERATE", the flag memory 5 is written, during access 420, to modify the flags of the image pixel zones written in the frame memory 1 during the access 421. The flag memory 5 may also be read, during an access 410, when a pixel is written in a pixel zone that has already been written. Specifically, in the case of images displayed transparently, the graphics generation unit reads, initially during the access 411, the pixels already written, in order to compose the image in transparency by superposing the second frame on the first frame.

The invention may apply to display devices with LCD screen and to display devices of the holographic projection type, notably to the devices called head-up visors.

It is evident that the invention is not limited to a particular display screen technology. It may be applied with LED (light-emitting diode), OLED (organic light-emitting diode) and CRT (cathode ray tube) screens for example.

What is claimed is:

1. A method for generating an image for display on a display device comprising a display screen and a graphics generation unit, the method comprising:
   erasing data stored in a second memory of the display device;
   generating an image consisting of pixels in a first memory; and
   displaying the image on the display device by reading a number of the pixels in the first memory and controlling the display screen, wherein:
      the image is divided into several distinct zones of pixels, each zone of pixels being addressed by a flag,
      the second memory stores a state of the flags of each zone of pixels allowing the graphics generation unit to execute the displaying of the image based on the state of the flags,
      the flags encode two states of the pixel zones:
         a first state if the addressed pixel zone comprises at least one pixel that has been modified by the generation of the image, the first state indicating that the pixels of the addressed pixel zone be read from the first memory, and
         a second state if no pixel of the addressed pixel zone has been modified by the generation of the image, the second state indicating that a default value be allocated to the pixels of the addressed pixel zone for the displaying of the image,
      erasing the data stored in the second memory of the display device comprises encoding, in the second memory, the state of the flags of each zone of pixels in the second state,
      generating the image in the first memory comprises encoding, in parallel and in the second memory, the state of the flags of modified pixel zones in the first state, and
      displaying the image comprises reading, from the first memory, the pixels of zones associated with flags in the first state, and allocating the default value to the pixels of zones associated with flags in the second state.

2. The method for generating the image according to claim 1, wherein the first memory has a burst data access mode, and the size of the data of each zone of pixels is equal to an integer multiple of the size of the data accessed in one cycle of the burst mode of the first memory.

3. The method for generating the image according to claim 1 wherein the default value corresponds to a background of the image.

4. An aircraft display device carrying out the method according to claim 1.

5. The display device according to claim 4, wherein the second memory is incorporated into the graphics generation unit.

6. The display device according to claim 5, wherein the second memory is incorporated into the first memory.

7. The display device according to claim 4, wherein the display device is a holographic projector.

* * * * *

UNITED STATES PATENT AND TRADEMARK OFFICE
CERTIFICATE OF CORRECTION

PATENT NO. : 8,593,473 B2
APPLICATION NO. : 12/809273
DATED : November 26, 2013
INVENTOR(S) : Levasseur et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 594 days.

Signed and Sealed this
Twenty-second Day of September, 2015

Michelle K. Lee
*Director of the United States Patent and Trademark Office*